(No Model.) 3 Sheets—Sheet 2.

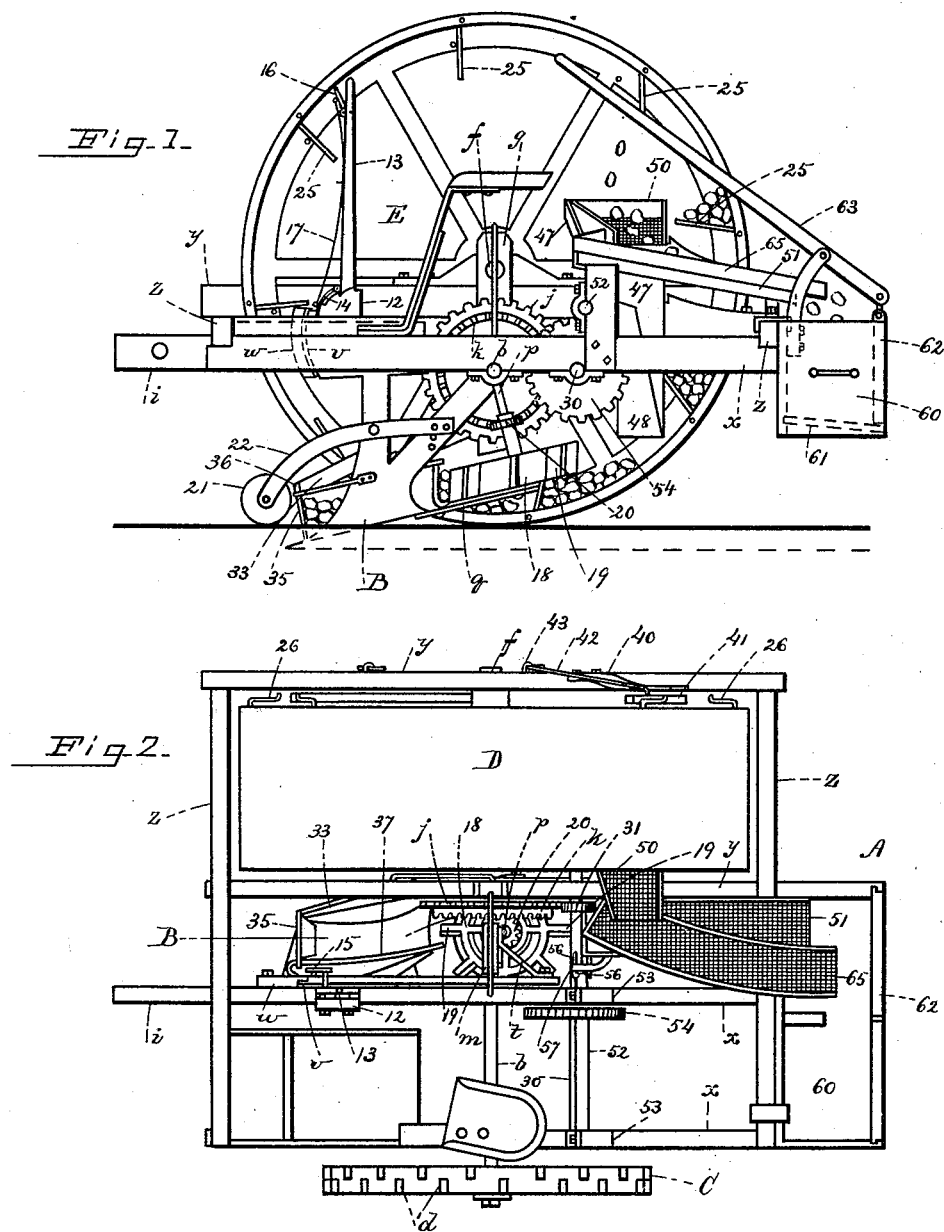

J. P. McLAREN.
POTATO DIGGER.

No. 391,059. Patented Oct. 16, 1888.

(No Model.) 3 Sheets—Sheet 3.

J. P. McLAREN.
POTATO DIGGER.

No. 391,059. Patented Oct. 16, 1888.

WITNESSES:
Helen M. Feegan.
E. M. Finney.

INVENTOR:
Josiah P. McLaren
PER C. A. Shawley
ATTYs.

N. PETERS, Photo-Lithographer, Washington, D. C.

UNITED STATES PATENT OFFICE.

JOSIAH P. McLAREN, OF CARDIGAN BRIDGE, PRINCE EDWARD ISLAND, CANADA, ASSIGNOR TO ELLEN C. McLAREN, OF BOSTON, MASSACHUSETTS.

POTATO-DIGGER.

SPECIFICATION forming part of Letters Patent No. 391,059, dated October 16, 1888.

Application filed July 5, 1888. Serial No. 279,002. (No model.)

*To all whom it may concern:*

Be it known that I, JOSIAH P. MCLAREN, a subject of the Queen of Great Britain, residing at Cardigan Bridge, Kings county, Prince Edward Island, Dominion of Canada, have invented a certain new and useful Improvement in Potato-Diggers, of which the following is a description sufficiently full, clear, and exact to enable any person skilled in the art or science to which said invention appertains to make and use the same, reference being had to the accompanying drawings, forming part of this specification, in which—

Figure 3:
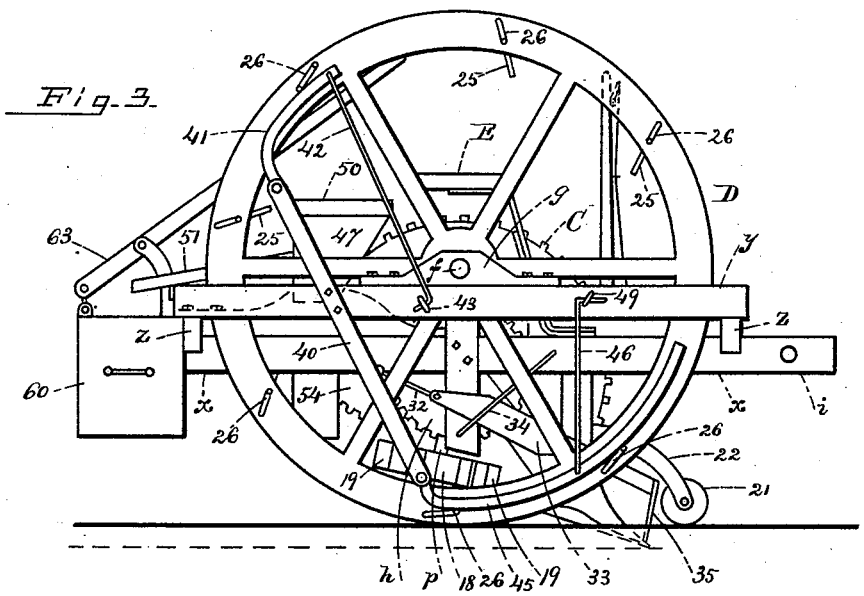
Figure 4:
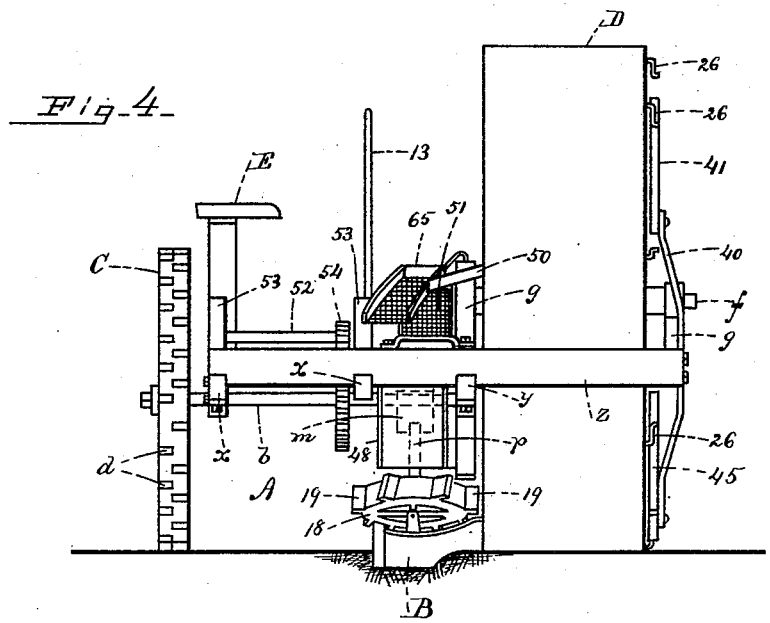
Figure 5:
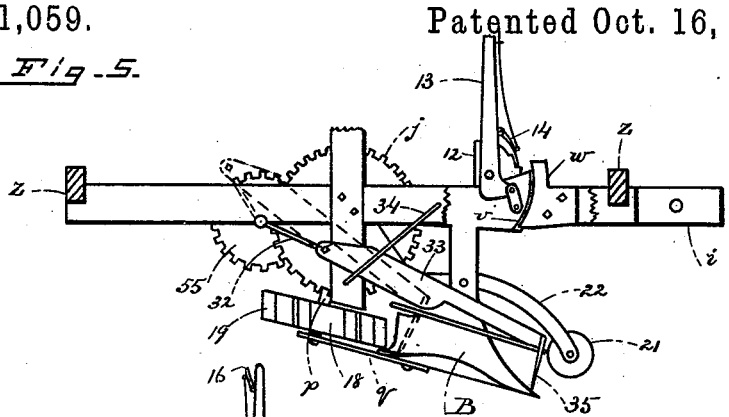
Figure 6:
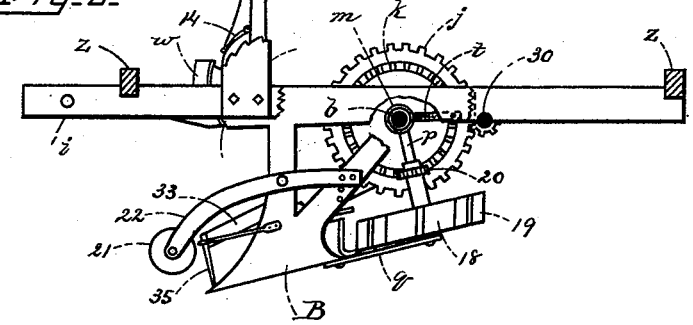
Figure 7:
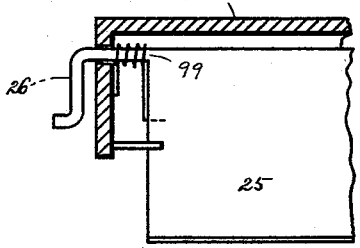
Figure 8:
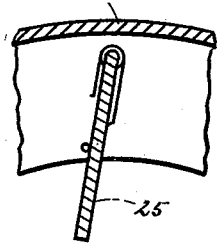

Figure 1 is a side elevation of my improved potato-digger, one of the wheels and the pole being represented as removed; Fig. 2, a top plan view of the same; Fig. 3, an elevation of the machine as viewed from the side opposite to that shown in Fig. 1; Fig. 4, an end elevation; Fig. 5, an enlarged side elevation showing the scoop and adjunctive mechanism; Fig. 6, an elevation of the parts shown in Fig. 5, viewed from the opposite side; and Figs. 7 and 8, enlarged views showing details of construction.

Like letters and figures of reference indicate corresponding parts in the different figures of the drawings.

My invention relates to that class of potato-diggers which separate the soil from the potatoes and deposit them in piles or heaps on the field as they are dug; and it consists in certain novel features, as hereinafter fully set forth and claimed, the object being to produce a more effective and otherwise desirable device of this character than is now in ordinary use.

The nature and operation of the improvement will be readily understood by all conversant with such matters from the following explanation.

In the drawings, A represents the body or frame-work of the digger; B, the scoop or shovel, and C D the supporting-wheels. The frame-work consists, essentially, of four longitudinally-arranged bars, *x y*, (see Fig. 2,) connected at their ends by cross-bars *z*. The supporting-wheel C is secured to the outer end of an axle, *b*, journaled centrally in the bars *x*, said wheel being provided on its periphery with grip-flanges *d* in the usual manner. The wheel D is of much larger diameter than the wheel C, and is provided with a very broad rim, as best shown in Figs. 2 and 4, said wheel being disposed between the bars *y y* and secured to a shaft, *f*, journaled in centrally-disposed standards *g* on said bars. A driver's seat, E, is secured to the outer bar, *x*, near the wheel C, and is provided with a foot-board, *s*, in the usual manner, the inner bar, *x*, being extended forward at *i*, to enable an ordinary tongue or pole to be secured thereto. A master gear-wheel, *h*, is disposed on the inner end of the shaft *b*, being provided on its periphery with teeth *j* and on its side with teeth *k*. A lug, *m*, Figs. 2 and 4, is journaled on the shaft *b* between the gear *h* and inner bar, *x*, and journaled in said lug there is a downwardly-projecting vertical shaft, *p*.

The shovel or scoop B (see Figs. 5 and 6) is constructed somewhat in the shape of an inverted plowshare, and is provided with a rearwardly-projecting arm, *q*, Fig. 1, in the outer end of which the lower end of the shaft *p* is journaled. The side of the shovel B is extended upward near the inner bar, *x*, and is formed of arms *r*, secured together in the shape of a triangle, the apex of said triangle being journaled on the shaft *b* and connected to the lug *m* by a rigid brace, *t*. (See Fig. 2.) The forward end of the upper or horizontal arm, *r*, of the shovel is rabbeted, as shown at *v* in Fig. 2, and slides vertically in a grooved block, *w*, secured to the inner bar, *x*, of the frame-work.

A toothed segment, 12, is secured to the inner bar, *x*, and pivoted by one end to said segment there is a lever, 13, provided with a pivoted pawl, 14, adapted to engage the teeth on said segment. Connecting the rabbeted end *v* of the horizontal arm *r* of the shovel and the pivoted end of the lever 13 is a hinged bar, 15. (See Fig. 2.) A hand-rod, 16, (see Fig. 1,) is pivoted to the upper end of the lever 13, being connected by a wire, 17, with the pawl 14, so that by compressing the rod 16 against said lever said pawl may be disengaged from the ratchet.

By moving the lever 13 the driver can readily adjust the shovel B to enter the ground (see Fig. 1) at any desired angle, said shovel turning on the shaft *b* at its pivotal point in a manner that will be readily understood by all conversant with such matters without a more explicit description.

Secured to the vertical shaft $p$, above the shovel-arm $q$, is a horizontally-arranged wheel, 18, provided on its periphery with radially-disposed broad flanges 19, and just above said wheel on said shaft is disposed a gear, 20, which intermeshes with the lateral teeth $k$ on the master-gear $h$. As the machine advances when in use, the shaft $b$ is set in motion, thereby causing the wheel 18 to revolve, the flanges 19 on said wheel catching the potatoes as they pass over the shovel and throwing them within the rim of the large wheel D. (See Fig. 1.) A pioneer or guide wheel, 21, is journaled on an arm or brace, 22, projecting forward from the shovel B. A horizontally-arranged shaft, 30, (see Fig. 2,) is journaled in the bars $x$ and inner bar, $y$, of the frame-work, said shaft being provided with a gear, 31, which intermeshes with the teeth $j$ on the periphery of the master-gear $h$. The inner end of the shaft 30 is provided with a crank, 32, (see Fig. 3,) and pivoted by one end to the outer end of said crank is a cam-lever, 33, running through and directed by a guide-bar, 34, secured to the inner frame-bar, $y$. To the outer end of the cam-lever 33 is secured a hoe, 35, (see Figs. 1, 5, and 6,) which is supported by means of a hook, 36, on a guide-rod, 37, secured to the shovel B on its return-stroke.

As the digger advances and the shaft 30 is rotated by means of the master-gear, the crank 32 on said shaft operates said cam-lever and causes the hoe 35 to drag the potatoes as they are unearthed by the shovel B back into the path of the flanged wheel 18, whence they are thrown into the interior of the wheel D, as hereinafter described.

A series of transversely and horizontally arranged plates, 25, are pivoted within the rim of the wheel C, (see Figs. 1 and 7,) the pivots of each of said plates being provided with a crank, 26, on the outer edge of said rim. (See Figs. 3, 4, and 7.)

A transversely-arranged rod, 40, (see Fig. 3,) is secured to the outer frame-bar, $y$, and pivoted to the upper end of said rod is a curved cam-bar, 41, held in position by a long hook, 42, which is secured to one end of said bar and engages an eye, 43, on the outer frame-bar, $y$. To the lower end of the rod 40 is pivoted a cam-bar, 45, (see Fig. 3,) curved on the same arc as the periphery of the wheel D and held in position by a hook, 46, secured to said cam-bar, and engaging an eye, 47, on the frame-bar $y$.

As the machine advances, rotating the wheel D, the forward end of the cam-bar 45 engages successively the cranks 26 of the plates 25, forcing said plates flatly against the inner side of the rim of said wheel. When the cranks 26 have passed the pivoted end of the cam-bar 45, which is disposed near the bottom of the wheel D, said cranks are released, and springs 99 (see Fig. 7) on the shafts of the plates 25 at once throw said plates into a vertical position, thus enabling them to catch the potatoes (see Fig. 1) as they are thrown into the rim of the wheel D by the flanged wheel 18. The plates 25 support the potatoes thus caught until said plates respectively pass a line drawn horizontally through the axis of the wheel at the rear, when their cranks 26 engage the pivoted ends of the cam-bar 41, upsetting said plates and delivering the potatoes therefrom into the screens or hoppers hereinafter described.

Secured to the inner frame-bar, $y$, (see Fig. 3,) and projecting laterally within the wheel D, is a chute, 47, which leads to a rearwardly-projecting chute, 48, (see Fig. 4,) secured between the inner frame bars, $x\ y$. Pivoted by one end to the inner end of the chute 47 is a screen, 50, adapted to receive and conduct the potatoes as they fall from the plates 25, as described. A similar longitudinally-arranged screen, 51, is pivoted by its outer end to the rear frame-bar, $z$, the free end of the screen 50 resting on the inner end of the screen 51 in position to deliver the potatoes. A shaft, 52, is journaled in standards 53 on the frame-bars $x$, and is provided with a gear, 54, intermeshing with a gear, 55, on the shaft 30. The inner end of the shaft 52 is provided with a fork or cam, 56, the arms of which alternately engage an arm, 57, (see Fig. 2,) secured to the free end of the screen 51, so that when the machine moves and the shaft 52 rotates the screens 50 and 51 will be oscillated and shake the dirt from the potatoes, causing it to pass through the screens and into the chutes, whence it falls to the ground.

A box or trunk, 60, for receiving the potatoes as they fall from the screen 51, is detachably secured to the rear frame-bar, $z$, said box being provided with an inclined bottom, 61, (see Fig. 1,) its rear side, 62, being adapted to slide vertically or to be opened, and thus dump the potatoes on the ground when the box is filled. The slide 62 is operated by the driver by means of a lever, 63, pivoted to said box, and having its short arm secured to said slide. A supplemental curved screen, 65, adapted to be detachably secured to the chute 51, is provided for the purpose of delivering the potatoes directly onto the ground at one side of the row or furrow when it is not deemed advisable to use the box 60.

In the use of my improvement the potatoes, as they are dug by the shovel B, are thrown by the flanged wheel 18 into the interior of the wheel D, and are caught by the plates 25 and delivered into the screen 50. The screens 50 and 51 being shaken by the cam or fork 56, as described, frees the potatoes from soil or dirt, and also causes them to travel downward on said screens into the box 60 or onto the ground, as the case may be.

Having thus explained my invention, what I claim is—

1. In a potato-digger, the combination of a frame-work, supporting-wheels, one of which is provided with a broad rim having interiorly-pivoted transverse plates, a shovel, mechanism operated by the supporting-wheels for forcing the potatoes from said shovel into said rim, and means for operating said plates and delivering the potatoes from said rim into a receptacle therefor, substantially as set forth.

2. In a potato-digger, the combination of a frame-work, supporting-wheels, one of which is of larger diameter than the other and provided with a broad rim, a shovel, mechanism operated by said wheels for delivering the potatoes from said shovel into said rim, pivoted transverse plates within said rim for carrying the potatoes above the axis of said wheel, cranks on said plates adapted to engage a cam-bar by which said plates are operated, and screens for receiving the potatoes from said plates, substantially as described.

3. In a potato-digger, the combination of a frame-work, two supporting-wheels journaled by separate shafts in said frame, one of said wheels being of larger diameter than the other and adapted to receive the potatoes, a shovel pivoted to the shaft of the small supporting-wheel, means for adjusting said shovel, a vertical shaft journaled in a lug on said main shaft, a flanged wheel in said vertical shaft for forcing the potatoes from said shovel into said large supporting-wheel, pivoted transverse plates within said large wheel, cranks on the pivots of said plates, cam-bars on said frame-work for engaging said cranks and operating said plates, screens for receiving and delivering the potatoes from said wheel, and means for shaking or oscillating said screens, substantially as set forth.

4. In a potato digger, the combination of the frame-work A, the shaft $b$, journaled in said frame and carrying the wheels C and gear $h$, the shovel B, journaled on the shaft $b$, the vertical shaft $p$, provided with the gear 20 and flanged wheel 18, the shaft $f$ in said frame, the wheel D on said shaft, provided with the plates 25, having the cranks 26, the cam-bars 41 and 45, adapted to engage said cranks, and the screens 50 and 51, for receiving the potatoes from said plates, substantially as described.

5. In a potato-digger, the combination of the frame A, the shaft $b$, journaled in said frame and provided with the gear $h$ and wheel C, the vertical shaft $p$, having the gear 20 and flanged wheel 18, the shovel B, pivoted to the shaft $b$, means for adjusting said shovel, the shaft $f$, the wheel D on said shaft, the plates 25, pivoted in said wheel and provided with the cranks 26, the cam-bars 41 and 45, for operating said plates, the screens 50 and 51, for receiving the potatoes from said plates, the shaft 52, provided with the cam-fork 56 and connected by gears with the gear $h$, for oscillating said screens, and the box 66, having an inclined bottom and sliding side for receiving and delivering the potatoes, substantially as set forth.

JOSIAH P. McLAREN.

Witnesses:
O. M. SHAW,
E. M. SPINNEY.